Figure 1:
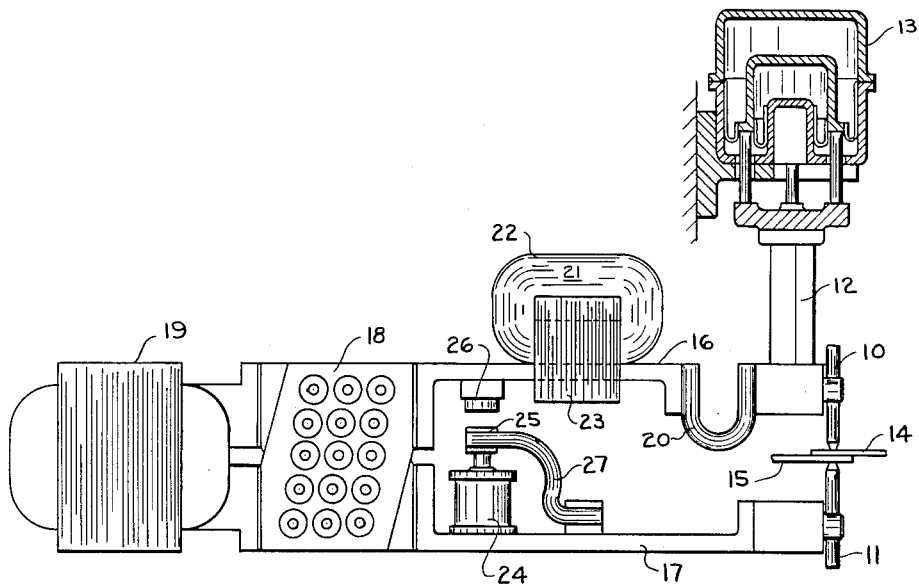

April 17, 1956

J. J. RILEY 2,742,552

APPARATUS FOR ELECTRIC RESISTANCE
WELDING OF SCALY METALS
Filed Jan. 19, 1953

INVENTOR
JOSEPH J. RILEY

BY Francis J. Klempay

ATTORNEY

United States Patent Office 2,742,552
Patented Apr. 17, 1956

2,742,552

APPARATUS FOR ELECTRIC RESISTANCE WELDING OF SCALY METALS

Joseph J. Riley, Warren, Ohio, assignor to The Taylor-Winfield Corporation, Warren, Ohio, a corporation of Ohio Application January 19, 1953, Serial No. 331,809

6 Claims. (Cl. 219—4)

The present invention relates to the art of electric resistance welding, and more particularly to improvements in the technique of and apparatus for resistance welding of metal workpieces having relatively non-conductive surface layers.

In many electric resistance welding operations the workpieces to be welded are comprised of hot rolled steel strip or sheet, or rusted material, for example, which is characterized by the presence of surface layers of relatively non-conductive scaly material which tends to restrict the passage of welding energy through the workpieces. Accordingly, it has been found necessary to utilize for such operations a welding voltage which is considerably higher than that required in the resistance welding of clean material. For example, an electrode voltage in the order of from eight to ten volts has been found necessary to break down scale formations of the type described whereby the welding operation may be properly carried out. Consequently, rectifier welders, which can produce a practical maximum welding voltage in the order of five volts, have been heretofore thought to be inadequate for welding such scaly material. And where the welding operation has been accomplished without first cleaning the material A. C. welding apparatus has been almost universally employed.

In many welding applications, however, it is preferable to employ rectifier welders, of the dry disc type, for example, in order to realize the advantages inherent therein as regards ease of control and consistency of results. And accordingly, it is an ultimate object of the present invention to provide a novel welding technique and apparatus for carrying out welding operations according to such technique whereby welding of scaly material may be carried out with D. C. welding equipment.

More specifically, it is an object of the present invention to provide a novel welding method for welding of scaly material wherein high voltage A. C. energy is initially applied to the material to be welded in order to break down and transform the scale for the subsequent passage therethrough of D. C. welding energy.

Another consideration in the welding of scaly material is the tendency of the material to more or less explode from around the point of contact of the electrodes and/or the point of passage of the welding energy between the workpieces. This has been found to be a result of the application to the workpieces of a high welding voltage. Thus, as another object, the invention seeks to provide a method or technique for welding scaly material wherein a high welding voltage may be initially applied to the material and thereafter gradually reduced as the resistance of the workpieces declines, the decline in resistance, of course, being a result of the breakdown of the surface scale occasioned by the application of the initially high voltage.

A further object of the invention resides in the provision of welding apparatus comprising a dry disc type rectifying device for supplying D. C. welding energy during the actual welding operation and suitable means for applying a high voltage A. C. welding voltage prior to such welding operation whereby to effect a breakdown or transformation of any surface scale which may be present on the material welded.

Yet another object of the invention is the provision in apparatus of the type characterized above of a device for applying a high initial A. C. voltage for breaking down surface scale formations which device is operative to automatically compensate for the decline of resistance between the welding electrodes by effecting a commensurate reduction of the A. C. voltage applied to the electrodes whereby violent expulsion of the scale during the breakdown or transformation thereof is avoided or materially reduced.

More particularly, the invention teaches the use for the purpose of applying a high initial A. C. welding voltage of a core type transformer of very high impedance comprising as the secondary winding thereof the secondary conductors of the welding apparatus whereby in response to an increase in A. C. current during transformation of the surface scale of the material to be welded the output voltage of the transformer is correspondingly reduced which in turn operates to limit the magnitude of current passing through the workpieces in accordance with the desired ends of the invention.

Another object of the invention resides in the provision in a welding machine of the type having a dry disc rectifier power supply and a high voltage A. C. supply of means operative during the application of high voltage A. C. energy to the workpieces to effectively isolate the rectifier from the high A. C. voltage to prevent the rectifier from becoming damaged by the application thereto of voltage in substantial excess of its rated capacity.

Other objects and advantages of the present invention will become apparent upon full consideration of the following detailed specification and accompanying drawing wherein is disclosed a preferred embodiment of the apparatus of my invention.

Figure 2:
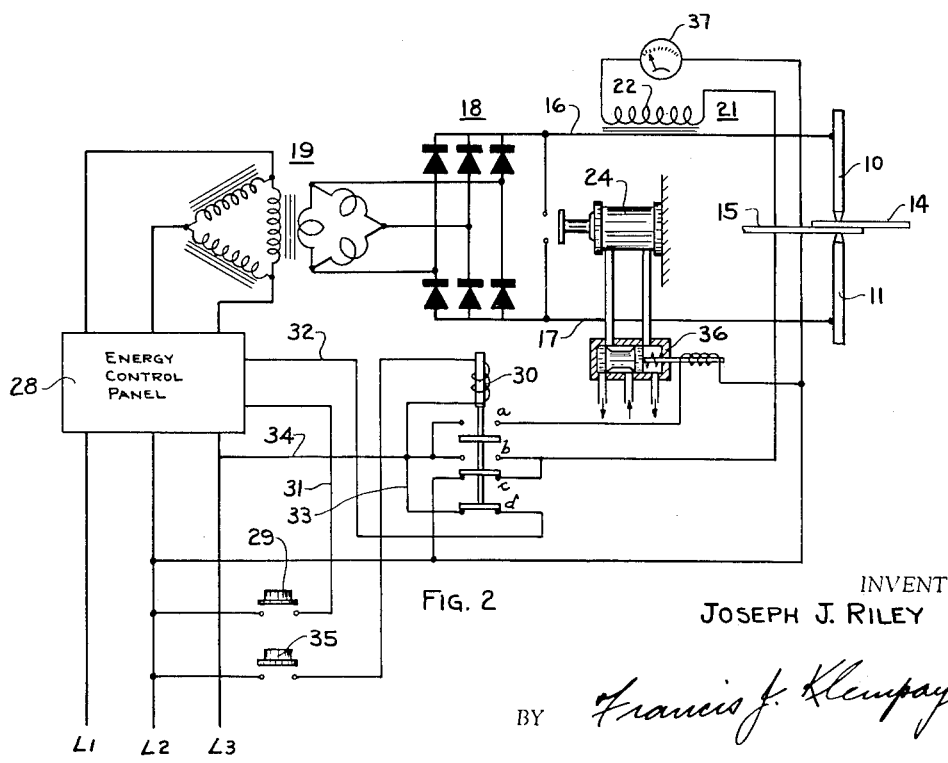

In the drawing:

Figure 1 is a simplified pictorial representation of a spot welding machine incorporating, in accordance with the teachings of my invention, a low voltage rectifier power supply and a high voltage A. C. supply; and Figure 2 is a schematic circuit diagram of a welding system and control therefor which may be used in the practice of my invention.

In Figure 1, the reference numerals 10 and 11 designate respectively upper and lower welding electrodes of a spot welding machine. In accordance with usual practice the upper electrode is mounted upon a slidably guided quill 12 which is in turn connected to a suitable fluid motor 13 whereby the upper electrode 10 may be moved vertically into and out of contact with workpieces 14 and 15 to be welded. Usually the lower electrode 11 is rigidly mounted.

Extending rearwardly (to the left as seen in Figure 1) of the electrodes 10 and 11 are current conductive buss bars 16 and 17 which connect respectively with positive and negative output terminals of a D. C. welding supply comprising a dry disc type rectifier bank 18 and a conventional welding transformer 19. The D. C. supply may be of the type disclosed in U. S. Patent No. 2,601,240 to Robert H. Blair, however this is not necessary to the practice of the invention.

In accordance with usual spot welder construction the upper conductor or buss bar 16 is provided adjacent the electrode 10 with a flexible portion 20 of several thicknesses of copper strip, for example, whereby the electrode may move relatively to the conductor 16 during normal operation of the welding apparatus.

The apparatus described to this point represents merely conventional direct current welding apparatus of a type and construction well known in the art, the rated output capacity of such welders being in the order of five volts (rectifier rating) and, for example, ten thousand amperes. As before stated, however, in the welding of materials having relatively non-conductive scaly surface layers an electrode voltage or welding voltage of in the order of five volts is often insufficient to properly initiate the welding operation. To overcome this difficulty I propose to provide a second welding transformer 21 comprising a multi-turn primary winding 22, a large iron core 23 and a single turn secondary comprising the secondary circuit of the welding apparatus. In the preferred construction the primary winding 22 is positioned closely adjacent the upper conductor 16 and the core 23 extends through the eye of the coil 22 and around the conductor 16. The arrangement, as will be readily understood, provides a high impedance coupling between the winding 22 and the welder secondary, and this is in accordance with the teachings of the invention.

Mounted on or in fixed relation to the lower conductor 17 is a vertically disposed air cylinder 24, the piston member of which carries a contact pad 25 at its upper end which contact is adapted upon extension of the said piston member to establish electrical contact with a fixed contact pad 26 carried by the upper buss or conductor 16. The lower or movable contact pad 25 carries the upper end of a flexible conductor 27 which is in electrical communication with the lower buss 17 whereby upon establishment of contact between pads 25 and 26 a shunt is provided between the buss conductors 16 and 17 which, in effect, eliminates the direct current supply components i. e. transformer 19 and rectifier 18, from the secondary circuit of the welding machine.

In carrying out the method of my invention, a welding operation is initiated by energizing the primary of transformer 21 with a suitable source of alternating current. The shunt comprising contact pads 25 and 26 and conductor 27 is closed at this time and accordingly the welding circuit is comprised of the just mentioned shunt, buss conductors 16 and 17, electrodes 10 and 11, and workpieces 14 and 15.

In accordance with the teachings of the invention the transformer 21 is so constructed that upon energization of the primary winding thereof an electrode or welding voltage of in the order of ten volts is produced. This is sufficient in most cases to cause breakdown and transformation of the surface scale of the workpieces 14 and 15 to permit the proper flow of welding current therethrough.

Breakdown of the surface scale of workpieces 14 and 15 is a progressive (as opposed to instantaneous) process and is evidenced by progressive increase in the flow of current through the welding apparatus and workpieces. Simultaneously with such increase in welding current, however, there is a commensurate reduction in welding voltage due to the high impedance losses in transformer 21. This phenomenon operates to prevent the violent expulsion of metal from about the points of contact of the work with the electrodes as may be understood.

Complete transformation of the surface scale of the workpieces 14 and 15 is evidenced by the welding current reaching a certain predetermined value, as for example ten thousand amperes, and at this time it is desirable to continue the welding operation with D. C. welding energy. Accordingly, at this time the transformer 21 is deenergized, as is cylinder 24, to terminate the flow of A. C. welding energy and open the shunt connection between buss conductors 16 and 17. Transformer 19 is now energized and the welding operation is pursued to completion in a wholly conventional manner.

Figure 2 illustrates an extremely simplified control system for operating the apparatus of Figure 1 in accordance with the teachings of my invention. A conventional energy control panel 28 comprising, for example, heat control, timing and sequencing components, is provided for the purpose of controlling the energization of the principal welding transformer 19 and, if desired, for the purpose of sequencing such energization in proper relation to the movement of electrode 10 into and out of contact with the workpieces. A manual control switch 29 is provided for the purpose of energizing the control panel 28 as desired. And in the present control system the manual switch 29 is connected in series relation with normally closed contacts 30d of a switching relay 30, the circuit being traceable from line conductor L2, conductor 31, control panel 28, conductor 32, contacts 30d, and conductors 33 and 34 to line conductor L3. The arrangement is such that relay 30 must be in a deenergized condition before the panel 28 may be energized.

Connecting line conductors L2 and L3 through normally open contact 30b of relay 30 is the primary winding 22 of transformer 21, and it will be readily observed that the transformer 21 will be energized in direct response to the energization of relay 30. An initiating switch 35 connected in series with the operating coil of relay 30 effects the energization thereof as determined by the operator of the welding machine.

Also connected across line conductors L2 and L3, through normally open contacts 30a of relay 30 is the operating coil of a four-way solenoid valve 36 which controls the flow of air or other fluid to the cylinder 24, the valve being arranged to normally direct fluid to the rod end of the cylinder 24 whereby to maintain the shunt across buss conductors 16 and 17 in a normally open condition. It will be apparent, however, that as the relay 30 is energized to activate or energize transformer 21, the valve 36 will also be energized to direct fluid to the head end of cylinder to close the shunt path in the manner desired.

In the present illustration I have shown a suitable current indicating device 37 in the primary circuit of transformer 21 which may be utilized by an operator of the welding machine to determine the rate of flow of welding current through the workpieces 14 and 15, and accordingly the optimum time at which to deenergize transformer 21 and energize transformer 19. Any suitable automatic device may be utilized to perform this function if desirable, the arrangement shown being intended for purposes of illustration only.

After the breakdown or transformation of the surface scale of workpieces 14 and 15 is completed, as indicated by the indicator 37 or other means, the machine operator may release switch 35 to simultaneously deenergize relay 30, transformer 21 and four-way valve 36. The shunt connection between buss conductors 16 and 17 is of course opened to condition the apparatus for operation by the D. C. supply. And through normally closed contacts 30c the primary winding 22 of transformer 21 is shorted in order to minimize the effect of the transformer 21 on the flow of current through the welding apparatus from transformer 19.

At this time switch 29 is closed by the machine operator, or by suitable automatic means if desired, and the energy control panel is energized to initiate the principal welding operation. As will be understood the panel 28 may include any conventional components such as heat control and/or timing devices to control the welding operation in the manner desired.

It should thus be apparent that I have accomplished the objects initially set forth. The method of my invention provides a simple and wholly practical technique for the spot or projection welding with rectifier welding apparatus of hot rolled steel strip, for example, which is characterized by the presence of scaly relatively non-conductive surface layers, and which for that reason requires an initial welding voltage which is substantially in excess of that which may be supplied by certain types of rectifier apparatus.

In the practice of my method it is possible to utilize apparatus which is for the most part entirely conventional, requiring but slight modification for the incorporation thereinto of a core type transformer, for example, which is capable of delivering a high initial voltage and which is of relatively high impedance whereby the welding voltage applied to the workpieces may be progressively reduced as the scaly surface layers of the stock is broken down. The additional control facilities which such apparaus may require may be of the most simple nature as will be readily apparent from inspection of Figure 2 of the drawing.

It should be understood, however, that the apparatus of my invention which is specifically illustrated and described herein is intended to be illustrative only and reference should be had to the appended claims in determining the true scope of the invention.

I claim:

1. In an electric resistance welding machine the combination with a pair of electrodes and buss conductors leading to said electrodes of a dry disc rectifier bank communicating at its output terminals with said conductors; a welding transformer communicating with the input terminals of said rectifier bank; a second transformer for said welding machine comprising a primary coil, said conductors and electrodes, and means providing a highly inductive coupling between said coil and said conductors and electrodes; shunt means positioned between said output terminals and said coil to short circuit said output terminals during energization of said coil; and a source of alternating current energy for sequentially energizing said coil and said transformer.

2. In an electric resistance welding machine the combination with a pair of electrodes and buss conductors leading to said electrodes of a source of limited voltage direct current welding energy communicating at its output terminals with said conductors, a high voltage transformer coupled electrically with said electrodes and conductors, means to sequentially energize said transformer and said source, means effective during energization of said transformer to provide a high impedance in the welding circuit comprising said transformer, electrodes and conductors, and shunting means whereby the secondary of said transformer is separated from the said direct current energy source when said transformer is energized.

3. In an electric resistance welding machine the combination with a pair of electrodes and buss conductors leading to said electrodes of a dry disc type rectifier communicating at its output terminals with said conductors, a welding transformer communicating with the input terminals of said rectifier, a second transformer in electrical communication with said conductors, means including a source of alternating current energy for sequentially energizing said second and welding transformers, and shunt means positioned between said second transformer and said output terminals and operative during energization of said second transformer to short circuit said output terminals.

4. Apparatus according to claim 3 further characterized by said second transformer comprising a primary coil and a large core for providing electrical coupling between said coil and said conductors, said conductors, electrodes and shunt comprising a secondary winding for said second transformer.

5. Apparatus according to claim 3 further characterized by said shunt comprising a switch, an air cylinder for operating said switch, and means responsive to energization of said second transformer to energize said air cylinder.

6. In an electric resistance welding circuit including a pair of electrodes and buss conductors leading to said electrodes; the combination of a dry disc type rectifier communicating at its output terminals with said conductors, an alternating current energy source connecting the input terminals of said rectifier, means including said energy source for impressing a relatively high alternating current voltage upon said electrodes, means to sequentially render said last mentioned means and said rectifier effective in said welding circuit, and switching means to substantially isolate said rectifier from said circuit at a predetermined schedule during the application of said alternating current source to said circuit.

References Cited in the file of this patent

UNITED STATES PATENTS

| 1,902,469 | Seede | Mar. 21, 1933 |
| 2,021,477 | Bohn | Nov. 19, 1935 |
| 2,089,213 | Labadie | Aug. 10, 1937 |
| 2,175,841 | Kafka et al. | Oct. 10, 1939 |
| 2,221,576 | Dawson | Nov. 12, 1940 |
| 2,326,590 | Weightman | Aug. 10, 1943 |
| 2,477,211 | Smith | July 26, 1949 |